United States Patent
Wang

(10) Patent No.: US 10,089,322 B2
(45) Date of Patent: Oct. 2, 2018

(54) PORTABLE ELECTRONIC DEVICE, METHOD FOR SHARING FILE BETWEEN MULTIPLE OPERATING SYSTEMS, RECORDING MEDIUM AND COMPUTER PROGRAM PRODUCT

(71) Applicant: Insyde Software Corp., Taipei (TW)

(72) Inventor: Chih-Kao Wang, Taipei (TW)

(73) Assignee: INSYDE SOFTWARE CORPORATION, Taipei (TW)

( * ) Notice: Subject to any disclaimer, the term of this patent is extended or adjusted under 35 U.S.C. 154(b) by 25 days.

(21) Appl. No.: 14/586,590

(22) Filed: Dec. 30, 2014

(65) Prior Publication Data

US 2015/0186409 A1 Jul. 2, 2015

(30) Foreign Application Priority Data

Dec. 31, 2013 (TW) .............................. 102149219 A

(51) Int. Cl.
  *G06F 9/54* (2006.01)
  *G06F 17/30* (2006.01)
(52) U.S. Cl.
  CPC ........ *G06F 17/30165* (2013.01); *G06F 9/544* (2013.01)

(58) Field of Classification Search
  CPC ................. G06F 17/3023; G06F 9/461; G06F 17/30165–17/30171
  See application file for complete search history.

(56) References Cited

U.S. PATENT DOCUMENTS

| | | | |
|---|---|---|---|
| 7,783,665 B1 * | 8/2010 | Tormasov | G06F 17/30165 707/783 |
| 2006/0248119 A1 * | 11/2006 | Stanev et al. | G06F 9/461 |
| 2007/0128899 A1 * | 6/2007 | Mayer | G06F 9/4406 439/152 |
| 2012/0084798 A1 * | 4/2012 | Reeves | H04L 67/1095 719/319 |

* cited by examiner

*Primary Examiner* — Nicholas Simonetti
(74) *Attorney, Agent, or Firm* — Muncy, Geissler, Olds & Lowe, P.C.

(57) ABSTRACT

A method for sharing a file between multiple operating systems on a probable electronic device is provided. The method includes the following steps: in a first operating system, a central processing unit storing a modified file into a memory of a shared access area; the central processing unit establishing a link relationship between the first operating system and a second operating system, so that the second operating system learns an address of the modified file stored in the memory of the shared access area; switching from the first operating system to the second operating system; and in the second operating system, the central processing unit accessing the modified file in the memory of the shared access area according to the link relationship.

11 Claims, 3 Drawing Sheets

PORTABLE ELECTRONIC DEVICE, METHOD FOR SHARING FILE BETWEEN MULTIPLE OPERATING SYSTEMS, RECORDING MEDIUM AND COMPUTER PROGRAM PRODUCT

BACKGROUND

Technical Field

The present invention relates to the field of electronic devices, and in particular, to a portable electronic device, a method for sharing a file between multiple operating systems on a probable electronic device, a recording medium and a computer program product.

Related Art

The use of two or more different operating systems on a single computer system, such as a Windows-based and a Linux-based operating system, is often desirable for users of portable electronic devices. Techniques known in the art that allow multiple OSs to be run on the same computer system include emulation, virtualization, and combinations of both.

If a user wants to switch to another operating system while maintaining an original working state of a current operating system, one option is to install a virtual operating system program; however, an operating system program constructed on the virtual operating system program cannot completely use hardware system resources; in another option, data of the current operating system needs to be stored into a storage device first, and a method of system restart or hibernation needs to be used, so as to achieve the purpose. When the user wants to perform synchronization (for example, an action of storing file data) or share file data between two or more distinct operating systems, neither of the foregoing two methods for switching between two or more distinct operating systems can achieve the purpose of the user.

SUMMARY

In view of the foregoing problem, an objective of the present invention is to provide a portable electronic device, a method for sharing a file between multiple operating systems on a probable electronic device, a recording medium and a computer program product, so that during switching from a current operating system to another operating system, a user can share file data between multiple operating systems without storing the file data into an external storage device.

A first aspect of the present invention provides a method for sharing a file between multiple operating systems on a probable electronic device. The method includes the following steps:

a central processing unit storing a modified file into a memory of a shared access area in a first operation system;

the central processing unit establishing a link relationship between the first operating system and a second operating system, so that the second operating system learns an address of the modified file stored in the memory of the shared access area;

switching from the first operating system to the second operating system; and in the second operating system, the central processing unit accessing the modified file in the memory of the shared access area according to the link relationship.

Another aspect of the present invention provides a recording medium with a stored program. After loading the program from the recording medium and executing the program, a portable electronic device is capable of completing the method of the first aspect of the present invention.

Another aspect of the present invention provides a computer program product with a stored program. After loading the program from the computer program product and executing the program, a portable electronic device is capable of completing the method of the first aspect of the present invention.

Another aspect of the present invention provides a portable electronic device. The portable electronic device includes:

a memory of a shared access area, used to be accessed by the first operating system and the second operating system in a shared manner; and a central processing unit, used to perform the method of the first aspect.

DETAILED DESCRIPTION

To make a person of ordinary skill in the technical field of the present invention understand the present invention better, content of the present invention and a desired effect are described in detail below by using listed exemplary embodiments of the present invention and with reference to the accompanying drawings.

Figure 1:
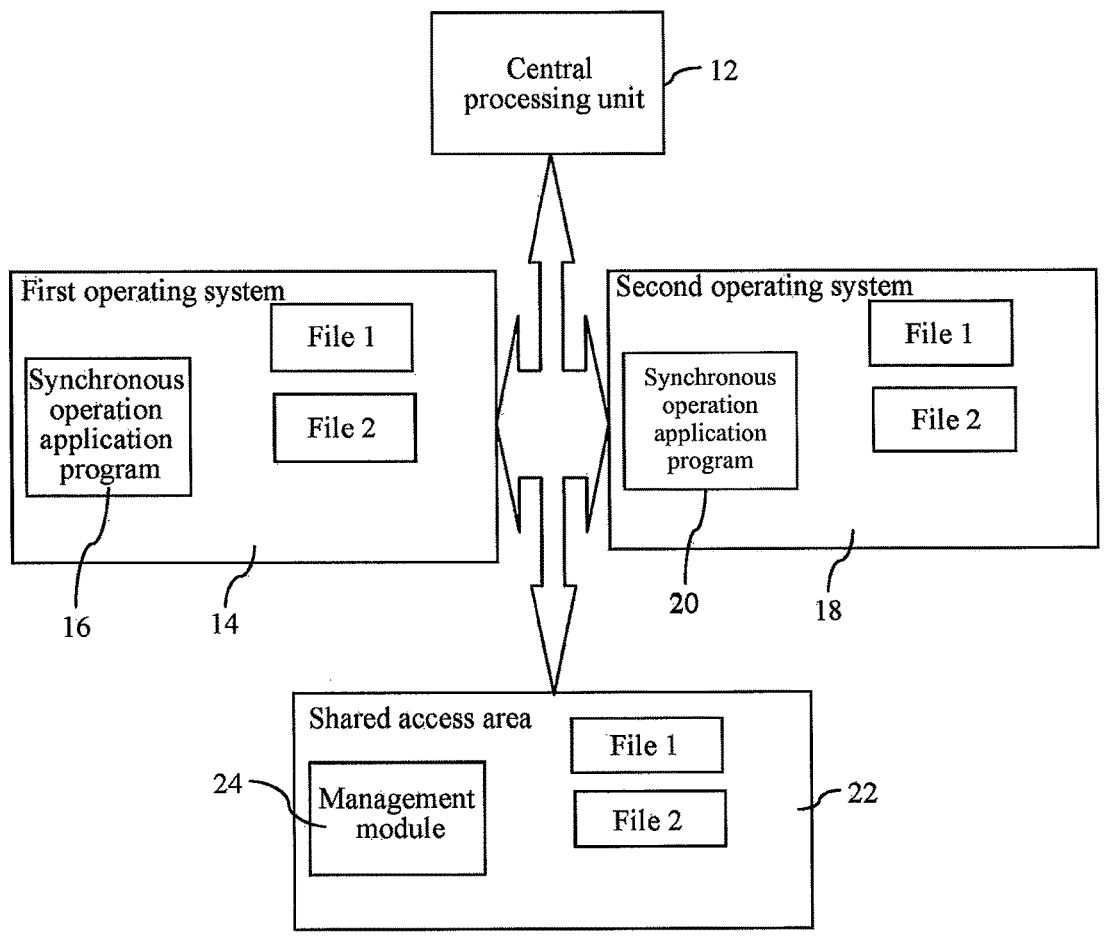
FIG. 1 is a structural block diagram of file sharing between two different operating systems according to an embodiment of the present invention.

FIG. 1 is a structural block diagram of file sharing between two different operating systems according to an embodiment of the present invention. In a first embodiment of the present invention, a central processing unit 12 in a portable electronic device 10 executes a program of a first operating system 14 (for example, a synchronous operation application program 16) or accesses file data (for example, data of a file 1 or a file 2) and executes a program of a second operating system 18 (for example, a synchronous operation application program 20) or accesses file data (for example, data of a file 1 or a file 2). The portable electronic device 10 may be an x86-based tablet or other x86 based computer system. The central processing unit 12 is an x86 CPU. The first operating system 14 and the second operating system 18 are two different operating systems, such as a Windows-based and a Linux-based operating system.

Memories (not shown in the figure) in the portable electronic device 10 include a first memory that belongs to the first operating system 14, a second memory that belongs to the second operating system 18 and a memory that belongs to a shared access area 22. The memory of the shared access area 22 is used by the first operating system 14 and the second operating system 18 to access a file.

A management module 24 in the portable electronic device 10 is located in the shared access area 22. The management module 24 is used to manage a file (for example, the data of the file 1 or the file 2) stored in the memory of the shared access area 22.

Figure 2:
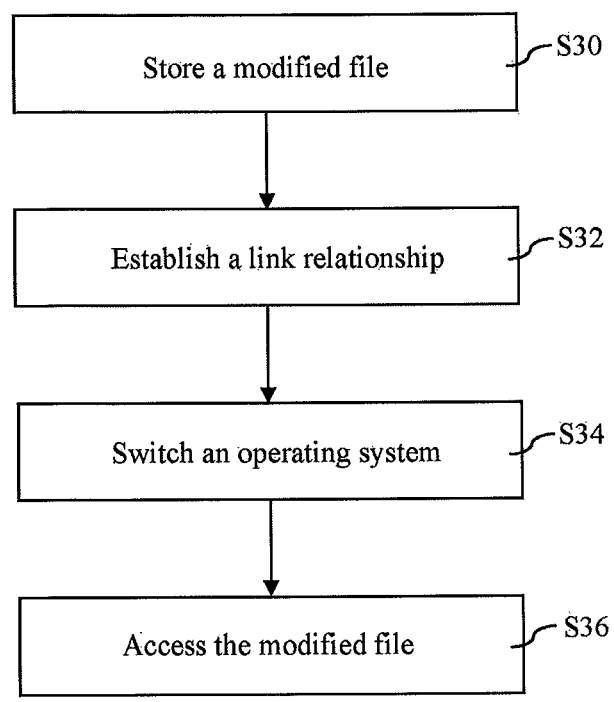
FIG. 2 is a flowchart of file sharing between two different operating systems according to an embodiment of the present invention.

FIG. 2 is a flowchart of file sharing between two different operating systems according to an embodiment of the present invention. Reference is made to components of FIG. 1 when process steps of FIG. 2 are described.

In FIG. 2, the central processing unit 12 executes the synchronous operation application program 16 of the first operating system 14. In the first operating system 14, after editing, adding or modification is performed on the file 1 for example, because the synchronous operation application program 16 is executed, the central processing unit 12 stores a modified file 1 into the memory of the shared access area 22 (as the file 1 in the shared access area 22 shown in FIG. 1) (Step S30).

Because the synchronous operation application program 16 is executed, the central processing unit 12 establishes a link relationship between the first operating system 14 and the second operating system 18 by using the prior art, so that the second operating system 18 learns an address of the modified file 1 stored in the memory of the shared access area 22 (Step S32).

When a user wants to switch from the first operating system 14 to the second operating system 18, a switching method is the same as that described in a patent application (R.O.C Invention Patent Publication No. 201229901, where the content of the application is incorporated into the present application for reference) previously filed by the applicant of the present invention, where the application discloses switching to the second operating system 18 after the first operating system 14 enters an S3-standby mode (Step S34).

In the second operating system 18, when the user wants to access the modified file 1 stored in the memory of the shared access area 22, the central processing unit 12 executes the synchronous operation application program 20 of the second operating system 18, and the central processing unit 12 accesses the modified file 1 in the memory of the shared access area 22 according to the link relationship (as the file 1 in the second operating system 18 shown in FIG. 1); therefore, editing, adding, or modification can be performed on the modified file 1 (Step S36). For a further modified file 1, Steps S30 and S32 can be performed again, so that the further modified file 1 is stored in the memory of the shared access area, and can be accessed by the first operating system 14.

In a second embodiment of the present invention, the first operating system 14 and the second operating system 18 are two different operating systems, and differences between process steps of the second embodiment and process steps of the first embodiment are also described with reference to the flowchart of FIG. 2.

In Step S30, in the second embodiment, because the synchronous operation application program 16 is executed, the central processing unit 12 stores a modified file 1 into a first memory that belongs to the first operating system 14 (as the file 1 in the first operating system 14 shown in FIG. 1), and synchronously stores a modified file 1 into the memory that belongs to the shared access area 22 (as the file 1 in the shared access area 22 shown in FIG. 1), while in the first embodiment, the step of storing a modified file 1 into a first memory that belongs to the first operating system 14 is not performed.

In Step S36, in the second embodiment, the central processing unit 12 executes the synchronous operation application program 20 of the second operating system 18, the central processing unit 12 accesses the modified file 1 in the memory of the shared access area 22 according to the link relationship and stores the modified file 1 into a second memory that belongs to the second operating system 18 (as the file 1 in the second operating system 18 shown in FIG. 1), while in the first embodiment, the step of storing the modified file 1 into a second memory that belongs to the second operating system 18 is not performed.

Figure 3:
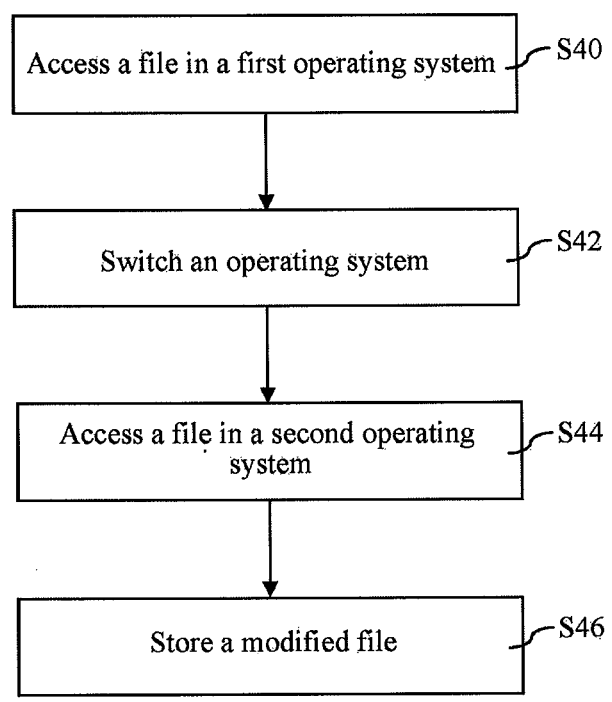
FIG. 3 is a flowchart of file sharing between two different operating systems according to another embodiment of the present invention.

FIG. 3 is a flowchart of file sharing between two different operating systems according to another embodiment of the present invention. Reference is made to components of FIG. 1 when process steps of FIG. 3 are described.

In a third embodiment of the present invention, the first operating system 14 and the second operating system 18 are two different operating systems. In FIG. 3, in the first operating system 14, when a user wants to access a file 1 stored in the memory of the shared access area 22, the central processing unit 12 executes the synchronous operation application program 16 of the first operating system 14, and the central processing unit 12 accesses the file 1 in the memory of the shared access area 22 according to a link relationship corresponding to the file 1 (as the file 1 in the first operating system 14 shown in FIG. 1), and therefore, editing, adding, or modification can be performed on the file 1; the management module 24 in the shared access area 22 records that the file 1 has been accessed by the first operating system 14 (Step S40). The link relationship is used to enable the first operating system 14 to learn an address of the file 1 stored in the memory of the shared access area 22.

When the user wants to switch from the first operating system 14 to the second operating system 18, a switching method is the same as that described in the foregoing: switching to the second operating system 18 after the first operating system 14 enters an S3-standby mode (Step S42).

In the second operating system 18, when the user wants to access the file 1 stored in the memory of the shared access area 22, the central processing unit 12 executes the synchronous operation application program 20 of the second operating system 18, and the central processing unit 12 accesses the file 1 in the memory of the shared access area 22 according to the link relationship corresponding to the file 1 (as the file 1 in the second operating system 18 shown in FIG. 1), and therefore, editing, adding, or modification can be performed on the file 1; the management module 24 in the shared access area 22 records that the file 1 has been accessed by the second operating system 18 (Step S44). The link relationship is used to enable the second operating system 18 to learn an address of the file 1 stored in the memory of the shared access area 22.

Because the synchronous operation application program 16 is executed in the first operating system 14 and the synchronous operation application program 20 is executed in the second operating system 18, the central processing unit 12 stores a first modified file in the first operating system 14 and obtained by modifying the file 1 and a second modified file in the second operating system 18 and obtained by modifying the file 1 into the memory of the shared access area 22 successively, and the management module 24 learns that the file 1 has been accessed by the first operating system 14 and the second operating system 18 according to previous records; therefore, the management module 24 sets the first modified file and the second modified file as two files of different versions, and stores the files in the memory of the shared access area 22 (Step S46). The management module 24 automatically stores the file as files of different versions according to different operating system names, so as to facilitate subsequent confirming and editing by the user.

The central processing unit 12 establishes a first link relationship corresponding to the first modified file and a second link relationship corresponding to the second modified file between the first operating system 14 and the second operating system 18, and the first link relationship and the second link relationship are used to enable the first operating system 14 and the second operating system 18 to learn addresses of the first modified file and the second modified file that are separately stored in the memory of the shared access area 22.

The foregoing method for sharing a file between two different operating systems of the present invention can be completed in a form of a program, and the program may be stored in a recording medium. After loading the program from the recording medium and executing the program, a portable electronic device can complete the method steps shown in the above description and drawings.

Similarly, the foregoing method for sharing a file between two different operating systems of the present invention can be completed by using a computer program product. After downloading the computer program product from the Internet and executing the computer program product, a portable electronic device can complete the method steps shown in the above description and drawings.

The present invention provides a portable electronic device, a method for sharing a file between two different operating systems, a recording medium and a computer program product, so that during switching from a current operating system to another operating system, a user can share file data between two different operating systems without storing the file data into an external storage device.

Although the present invention has been described above with reference to the exemplary embodiments and exemplary drawings, the exemplary embodiments and exemplary drawings should not be regarded as a limitation. Various modifications, omissions and variations that are made by a person skilled in the art on the form and embodiments of the present invention do not depart from the scope claimed by the present invention.

What is claimed is:

1. A method for sharing a file between multiple operating systems on a probable electronic device comprising:
   a central processing unit storing a modified file into a memory of a shared access area in a first operating system executed on the portable electronic device and the modified file into a first memory in which the first operating system is stored while storing the modified file into the memory of the shared access area;
   the central processing unit establishing a link relationship between the first operating system and a second operating system, so that the second operating system learns an address of the modified file stored in the memory of the shared access area;
   causing the first operating system to enter an S3 mode;
   executing the second operating system on the portable electronic device after the first operating system enters the S3 mode;
   in the second operating system, upon receiving a user's request to access the modified file, the central processing unit executing a synchronous operation application program of the second operation system to access the modified file in the memory of the shared access area according to the link relationship; and
   in the second operating system, the central processing unit storing the accessed modified file into a second memory in which the second operating system is stored.

2. The method according to claim 1, wherein the first operating system and the second operating system are different operating systems.

3. A non-transitory computer readable recording medium with a stored program, wherein after loading the program from the recording medium and executing the program, a portable electronic device is capable of completing the method according to claim 1.

4. A portable electronic device comprising:
   a memory of a shared access area, used to be accessed by a first operating system and a second operating system in a shared manner; and
   a central processing unit, used to perform the method according to claim 1.

5. The portable electronic device according to claim 4, wherein the portable electronic device is an x86-based computer system.

6. The portable electronic device according to claim 4, further comprising:
   a first memory, used to be accessed by the first operating system, wherein the central processing unit stores the file into the first memory while storing the modified file into the memory of the shared access area; and
   a second memory, used to be accessed by the second operating system, wherein the central processing unit accesses the modified file in the memory of the shared access area according to the link relationship and stores the file into the second memory.

7. The portable electronic device according to claim 6, wherein the portable electronic device is an x86-based computer system.

8. A method for sharing a file between two different operating systems on a probable electronic device, wherein a first operating system and a second operating system are different, and the method comprises the following steps:
   in the first operating system executed on the portable electronic device, a central processing unit accessing a file in a memory of a shared access area according to a link relationship corresponding to the file, and a management module recording that the file has been accessed by the first operating system, wherein based on the link relationship, the second operating system learns an address of the file stored in the memory of the shared access area;
   causing the first operating system to enter an S3 mode;
   executing the second operating system on the portable electronic device after the first operating system enters the S3 mode;
   in the second operating system, upon receiving a user's request to access the file in the shared access area, the central processing unit executing a synchronous operation application program of the second operation system to access the file in the memory of the shared access area according to the link relationship corresponding to the file, and the management module recording that the file has been accessed by the second operating system;
   the central processing unit storing a first modified file in a first memory in which the first operating system is stored, and obtained by modifying the file and a second modified file in a second memory in which the second operating system is stored, and obtained by modifying the file into the memory of the shared access area successively, the management module learning that the file has been accessed by the first operating system and the second operating system, and the management module setting the first modified file and the second modified file as two files of different versions.

9. The method according to claim 8, wherein in the step of the management module setting the first modified file and the second modified file as two files of different versions, the central processing unit establishes a first link relationship corresponding to the first modified file and a second link relationship corresponding to the second modified file between the first operating system and the second operating system, wherein the first link relationship and the second link relationship are used to learn addresses of the first modified file and the second modified file that are separately stored in the memory of the shared access area.

10. A portable electronic device, comprising:
- a memory of a shared access area, used to be accessed by a first operating system and a second operating system in a shared manner;
- a management module, used to manage a file stored in the memory of the shared access area; and
- an x86 central processing unit, used to perform the method according to claim 8.

11. A non-transitory computer readable recording medium with a stored program, wherein after loading the program from the recording medium and executing the program, a portable electronic device is capable of completing the method according to claim 8.

* * * * *